United States Patent
Curwen et al.

(10) Patent No.: US 6,867,699 B2
(45) Date of Patent: Mar. 15, 2005

(54) METHOD OF AND APPARATUS FOR ACTUATING AN OPERATION

(76) Inventors: Rupert William Meldrum Curwen, 24 Alpha Terrace, Cambridge, CB2 2HT (GB); Peter Joseph Steggles, 70 Melvin Way, Cambridge, CB4 9HZ (GB); Robert Gordon Hague, 191 Sturton Street, Cambridge, CB4 9HZ (GB)

( * ) Notice: Subject to any disclaimer, the term of this patent is extended or adjusted under 35 U.S.C. 154(b) by 0 days.

(21) Appl. No.: 10/267,685

(22) Filed: Oct. 9, 2002

(65) Prior Publication Data

US 2003/0025609 A1 Feb. 6, 2003

Related U.S. Application Data

(63) Continuation of application No. 09/801,243, filed on Mar. 7, 2001, now Pat. No. 6,567,005.

(30) Foreign Application Priority Data

Mar. 18, 2000 (GB) .............................................. 0006458

(51) Int. Cl.⁷ .............................................. G08B 23/00
(52) U.S. Cl. .............................. 340/573.4; 340/310.01; 340/538; 340/539.1; 340/572.1; 340/825.49; 340/5.2; 340/3.5; 340/10.1; 340/10.42
(58) Field of Search .......................... 340/573.4, 310.01, 340/538, 539, 572.1, 825.49, 5.2, 3.5, 10.1–10.42

(56) References Cited

U.S. PATENT DOCUMENTS

| | | | |
|---|---|---|---|
| 4,174,517 A | 11/1979 | Mandel | 340/310 A |
| 4,200,862 A | 4/1980 | Campbell et al. | 340/310 A |
| 4,598,275 A * | 7/1986 | Ross et al. | 340/573.4 |
| 5,363,425 A * | 11/1994 | Mufti et al. | 379/201.06 |
| 5,396,227 A * | 3/1995 | Carroll et al. | 340/825.36 |
| 5,544,037 A | 8/1996 | Luger | 364/146 |
| 5,572,192 A * | 11/1996 | Berube | 340/574 |
| 5,650,774 A | 7/1997 | Drori | 340/825.32 |
| 5,745,049 A | 4/1998 | Akiyama et al. | 340/870.17 |
| 6,229,433 B1 | 5/2001 | Rye et al. | 340/310.01 |
| 6,348,867 B1 * | 2/2002 | Myllymaki | 340/573.1 |
| 6,381,418 B1 * | 4/2002 | Spurr et al. | 396/310 |
| 6,567,005 B2 * | 5/2003 | Curwen et al. | 340/573.4 |

FOREIGN PATENT DOCUMENTS

JP 11-167688 6/1999

* cited by examiner

*Primary Examiner*—Daniel Wu
*Assistant Examiner*—Tai T. Nguyen
(74) *Attorney, Agent, or Firm*—Renner, Otto, Boisselle & Sklar, LLP

(57) ABSTRACT

A technique is provided for providing total flexibility of control of any desired operation within an environment where personnel work, such as an office suite. The location of transponders is determined by a location system. A user arbitrarily selects a convenient region for controlling an operation and the location system registers this in a memory. The location system then determines the position of each transducer and, when a transducer is within one of the selected regions, the location system responds by controlling the operation. For example, a region may be selected entirely arbitrarily so as to control room lighting.

11 Claims, 5 Drawing Sheets

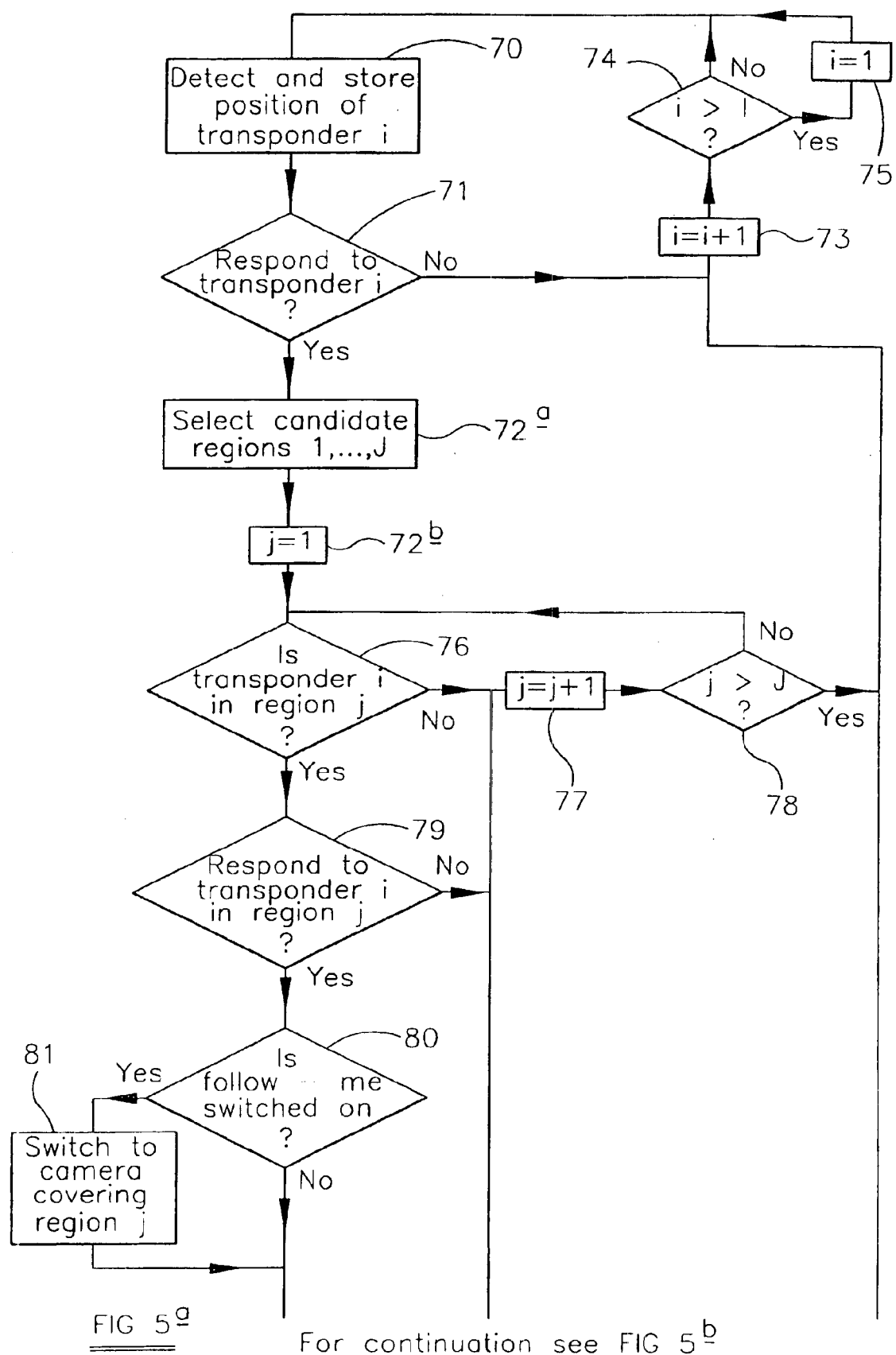
FIG 5ᵃ
For continuation see FIG 5ᵇ

METHOD OF AND APPARATUS FOR ACTUATING AN OPERATION

This is a continuation of application Ser. No. 09/801,243, filed Mar. 7, 2001, now U.S. Pat. No. 6,567,005.

BACKGROUND OF THE INVENTION

The present invention relates to a method of and an apparatus for actuating an operation.

In the field known as "sentient computing", a system for locating each of a plurality of transponders is disclosed in GB 2 320 089, GB 2 332 052, GB 2 332 053, GB 2 332 054, GB 2 332 055, and British Patent Application No. 9929900.0. Each transponder comprises a receiver for receiving a radio signal directed to all of the transponders of the system. The output of the receiver is connected to a decoder for recognising the code corresponding to the individual transponder. When that code is received, the decoder actuates an ultrasonic transducer, which emits a short burst or single pulse of ultrasonic radiation. The transponder also comprises a transmitter which can be manually actuated by a switch to transmit a radio signal carrying the code of the individual transponder.

A plurality of ultrasonic transducers are distributed spatially about an environment in which the transponders are to be located. For example, the environment may comprise a single room or a set of rooms constituting an office, laboratory or other commercial establishment. The receiving transducers are, for example, disposed on the ceilings of the room or rooms and convert received ultrasonic pulses into corresponding electrical pulses which are supplied to a central processing unit.

The central processing unit is connected to a transmitter which transmits the transponder codes in sequence so as to poll the transponders in turn. In particular, each transponder code is used to modulate a radio frequency carrier and the codes are transmitted in sequence with sufficiently large gaps between consecutive codes for the ultrasonic energy transmitted by each transponder to have decayed sufficiently before the next transponder is polled so as to avoid confusion. The time delay between polling each transponder and the initial time of arrival of the ultrasonic pulse which it emits to each receiving transducer allows the central processing unit to determine the position of each transponder to within a few centimeters of its actual location.

The central processing unit is also connected to a receiver which receives the signals transmitted by the transponders and actuates predefined operations in response thereto.

JP 11167688 A discloses an arrangement which is concerned with the management of the elderly and infirm so as to prevent their wandering out of or escaping from an institution providing residential care. The inmates wear shoes containing a form of transponder which is actuated upon receipt of induced power so as to transmit a code identifying the inmate. Access points in various boundaries are provided with sensors which power a transponder by induction when the transponder is crossing a boundary and which receive the code identifying the inmate and forward it via a hard-wired network to a central control together with a code identifying the location at the boundary. The sensors are generally fixed at doorways and gateways and the system can only infer, from detection of boundary crossings, whether each inmate is inside or outside a room, building or the like. Such a system cannot therefore detect the position of an inmate anywhere within the area which is covered by the system but can, at best, only give an indication of whether an inmate is within a given boundary or between two nested boundaries. The positions of the sensors are fixed and predetermined in such a way that they cannot be arbitrarily selected. Further, the locations of the sensors are associated with the crossing of one or more boundaries by inmates.

SUMMARY OF THE INVENTION

According to a first aspect of the invention, there is provided a method of actuating an operation, comprising the steps of:
- (a) selecting, within a continuous three dimensional space constituting an environment for personnel within which personnel are able to move substantially freely, at least one arbitrary region having no association with the operation at the time of selection;
- (b) storing in a memory the at least one selected region;
- (c) determining the position of at least one transponder anywhere within the space; and
- (d) actuating the operation when the position of the at least one transponder is determined to be within the at least one selected region.

According to a second aspect of the invention, there is provided an apparatus for actuating an operation, comprising: at least one transponder; a transponder location system for determining the location of the at least one transponder anywhere within a continuous three dimensional space constituting an environment for personnel within which personnel are able to move substantially freely, the system including a memory for storing data identifying at least one arbitrarily selected region having no association with the operation at the time of selection; and a comparator for comparing the location of the at least one transponder with the at least one selected region and for actuating the operation when the location of the at least one transponder is within the at least one selected region.

This technique allows any operation to be controlled merely by selecting arbitrarily any region within the environment to act as a control for the operation. The or each region can be selected entirely arbitrarily, for example so as to be convenient to a user. At the time of selecting the or each region, it has no association with the operation which is to be actuated or controlled. There are therefore no constraints on the selection of the or each region and the selection may be done purely for convenience. In principal, any operation which is capable of being controlled may be controlled in this way. Thus, there are no constraints on operations which may be controlled using this technique other than that they are capable of being controlled in response to some type of signal or information.

Although not essential, the space may be enclosed.

For convenience, the or each selected region may be partially delimited by a solid surface within the space. Examples of such solid surfaces include room walls and desktops.

The operation may be actuated solely in response to the position of the at least one transponder being determined to be within the at least one selected region. As an alternative, the operation may be actuated in response to: the position of the at least one transponder being determined to be within the at least one selected region; and a user-actuated signal from the at least one transponder. For this purpose, the at least one transponder may comprise a manually actuated transmitter for transmitting an actuation signal to the location system and the comparator may be arranged to actuate the operation only when the actuation signal is received while the location of the at least one transponder is determined to be within the at least one selected region.

The apparatus may comprise a plurality of transponders forming a set and the step (c) may comprise determining the positions of the plurality of transponders comprising the set. The operation may be actuated when the position of any of the transponders of the set is determined to be within the at least one selected region. As an alternative, the operation may be actuated only when the position of any transponder of a proper subset of the set of transponders is determined to be within the at least one selected region. Thus, the actuation of an operation may be limited to only certain transponders which may, for example, be carried by personnel who are authorised to actuate or control the operation.

The location system may be arranged to identify the transponder responsible for actuating the operation. At least one aspect of the performance of the operation may be determined by the identity of the transponder responsible for actuating the operation. Thus, different transponders, for example carried by different personnel, can actuate or control the operation such that different results are achieved. Also, once a transponder has actuated an operation, the resulting performance of the operation may follow the location of the transponder and hence the person carrying the transponder.

The location system may be arranged to poll periodically the at least one transponder to determine the location thereof. The rate of polling of the or each transponder may be increased when its position is determined to be within the at least one selected region. In cases where the operation is dependent in some way on the position of the transponder, the normal polling rate may not be sufficient to provide adequate positional resolution when the transponder is being moved relatively rapidly. Thus, the polling rate may be increased for such a transponder without the need to increase the normal polling rate of other transponders which are not currently being used to control an operation.

The location system may be arranged to determine the relative position of the at least one transponder with respect to a reference position in the at least one selected region and the comparator may be arranged to control the value of a parameter of the operation in accordance with the relative position. Although relatively simple operations, such as toggling between on and off states, may be controlled effectively by the presence of a transponder in a selected region, it is also possible to use the position of a transponder to control some aspect of the operation. For example, the relative position may be a one-dimensional position and the parameter may be a scalar parameter. In another example, the relative position is a two-dimensional position adjacent a surface and the parameter is a two dimensional vector parameter. The surface may be a solid surface within the space. In the case of a scalar parameter, a slider control may be defined at any desired location so as to control the magnitude and possibly the polarity of some aspect of the operation. Also, a surface may be used to define a more complex operation, such as the two dimensional position of a cursor on a computer screen in essentially the same way as a conventional mouse may be used.

The method may be used with a plurality of spatially distributed indicators for providing a user-perceivable indication and the method may comprise selecting, in response to actuation of the operation, the indicator nearest the or each transponder whose position is determined to be within the at least one selected region to produce an indication of acknowledgement of the actuation of the operation. For this purpose, each indicator may have a respective transponder and the location system may be arranged to determine the distance between the transponder of each indicator perceivable by a user and the at least one transponder and to actuate the indicator whose transponder is nearest the at least one transponder. Where the operation is of the type whose actuation or control is clear to personnel, no further indication is necessary. However, it may be that the nature of the operation is such that a person cannot tell whether it has been successfully actuated. This technique ensures that an indication, such as a visual or audible indication, is provided in a way such that the user has confirmation of successful actuation or control.

Although the at least one region is selected arbitrarily and with no initial association or connection with the operation to be controlled, for convenience, labels identifying the operation may be disposed at the or each selected region. Indeed, such labels may be disposed at the or each region before registration in the location system, for example at the time of selection. However, the mere disposal of such a label does not imply any association between the selected region and the operation i.e. selection remains entirely arbitrary and is not in any way determined by the actual operation.

The step (a) may comprise: disposing the transponder or one of the transponders at a location within the or each selected region; detecting the position of the transponder; providing a user actuated signal to cause the detected position to be stored in the transponder location system; and defining a boundary of the selected region. The location system may comprise a user interface for actuating storage of a determined location of the at least one transponder for defining the at least one selected region. This represents a very convenient way of registering and defining the or each selected region.

The method may comprise actuating at least one further operation of the system by: selecting within the space, for the or each further operation, at least one further arbitrary region having no association with the further operation at the time of selection; storing in the memory the at least one further selected region; and actuating the or each further operation when the position of the at least one transponder is determined to be within the corresponding at least one selected further region. For this purpose, the memory may be arranged to store data identifying at least one further arbitrarily selected region having no association with a further operation at the time of selection and the comparator may be arranged to actuate the further operation when the location of the least one transponder is within the at least one further selected region. Thus, more than one operation may be controlled using the same location system and transponder or transponders. There is no theoretical limit to the number of different operations and different types of operation which may be controlled using the same hardware. Further, operations may or may not be transponder-specific in the sense of responding to only some of the transponders whereas transponders may or may not be operation-specific in that each transponder may control one or more than one such operation.

BRIEF DESCRIPTIONS OF THE INVENTION

The invention will be further described, by way of example, with reference to the accompanying drawings, in which.

Like reference numerals refer to like parts throughout the drawings.

DESCRIPTION OF THE PREFERRED EMBODIMENT

Figure 1:
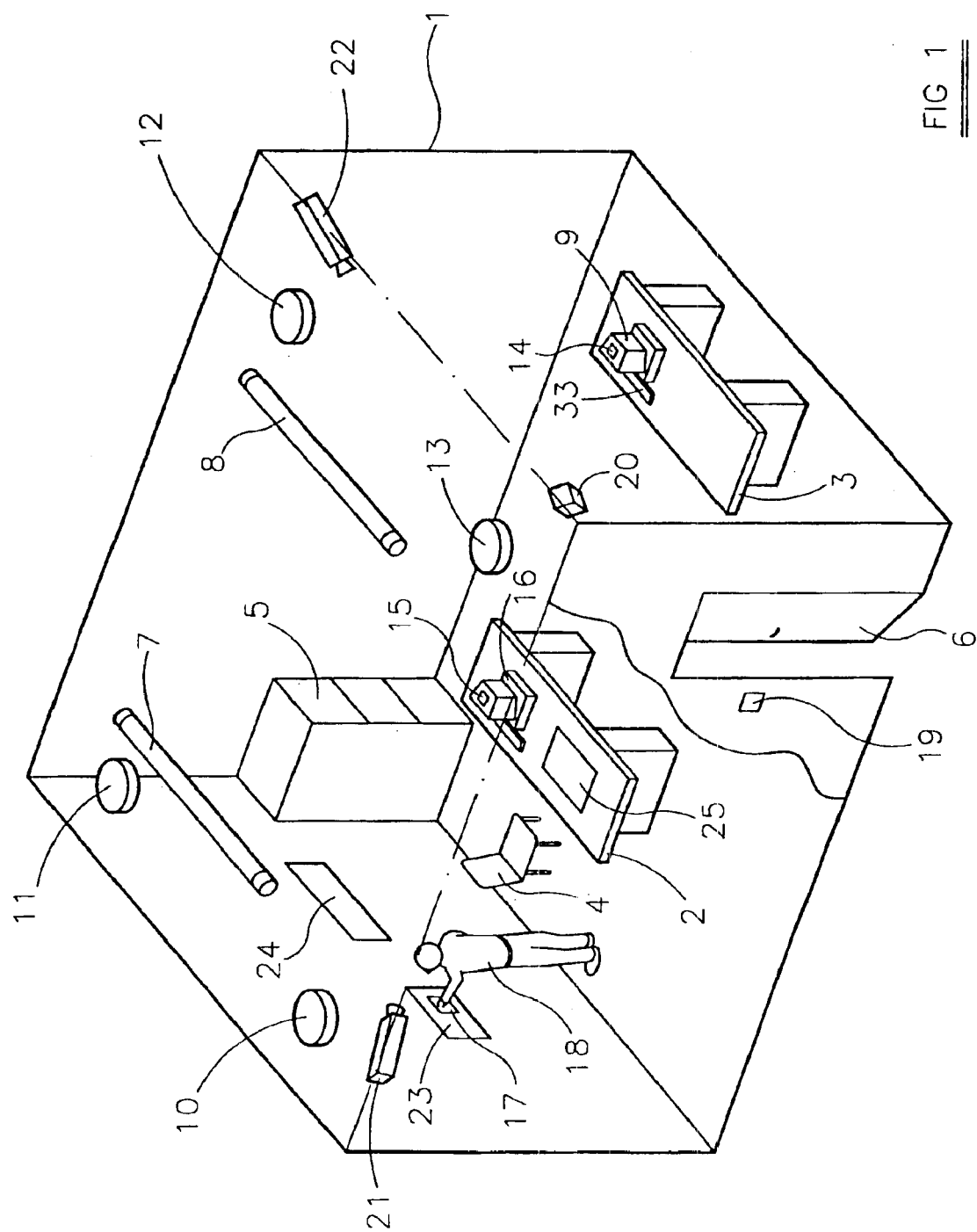
FIG. 1 illustrates diagrammatically a room in which a system constituting an embodiment of the invention is installed.

FIG. 1 illustrates a room 1 forming part of an office environment or other environment provided with a transponder location system. This is a typical example of a three dimensional space about which personnel may move relatively freely, for example about the room 1 and from room to room of the whole environment. For the sake of simplicity, only a single room of the environment is illustrated.

The room contains furniture illustrated as tables 2 and 3, a chair 4 and a filing cabinet 5. Freedom of movement of personnel is limited only by the need to avoid such obstacles and the walls defining the room 1. The room is also provided with fixtures and fittings exemplified by a door 6 and overhead lighting in the form of individual lights 7 and 8.

The room also contains part of a transponder location system. This system comprises a computer 9 connected by any suitable communication link, such as wiring, to ceiling-mounted transducers 10 to 13 which convert ultrasonic acoustic energy into corresponding electrical signals and supply these signals to the computer 9.

The system comprises a plurality of transponders which are actuated in turn by the computer 9 over a radio communication link and which respond by emitting a pulse of ultrasonic energy. For example, transponders 14 and 15 are located on and associated with the computer 9 and another computer or terminal 16 forming part of a local area network served by the computer 9. The locations of such transponders 14 and 15 do not, in general, vary frequently with time. However, these transponders serve to determine the locations of the apparatuses to which they are attached.

Other transponders, such as that illustrated at 17, are carried by personnel such as a user 18. The positions of these transponders 17 thus vary with time according to the location of each user within the room 1.

FIG. 1 illustrates a conventional fixed light switch 19 disposed adjacent the opening for the door 6 and arranged to switch on and off the overhead lighting comprising the lights 7 and 8. The room 1 is also provided with a video surveillance system including closed circuit video cameras 20 to 22. The surveillance system is controlled by the computer 9 as described hereinafter.

FIG. 1 also illustrates three arbitrarily selected regions 23, 24 and 25. The selection and purpose of these regions will be described in detail hereinafter.

Figure 2:
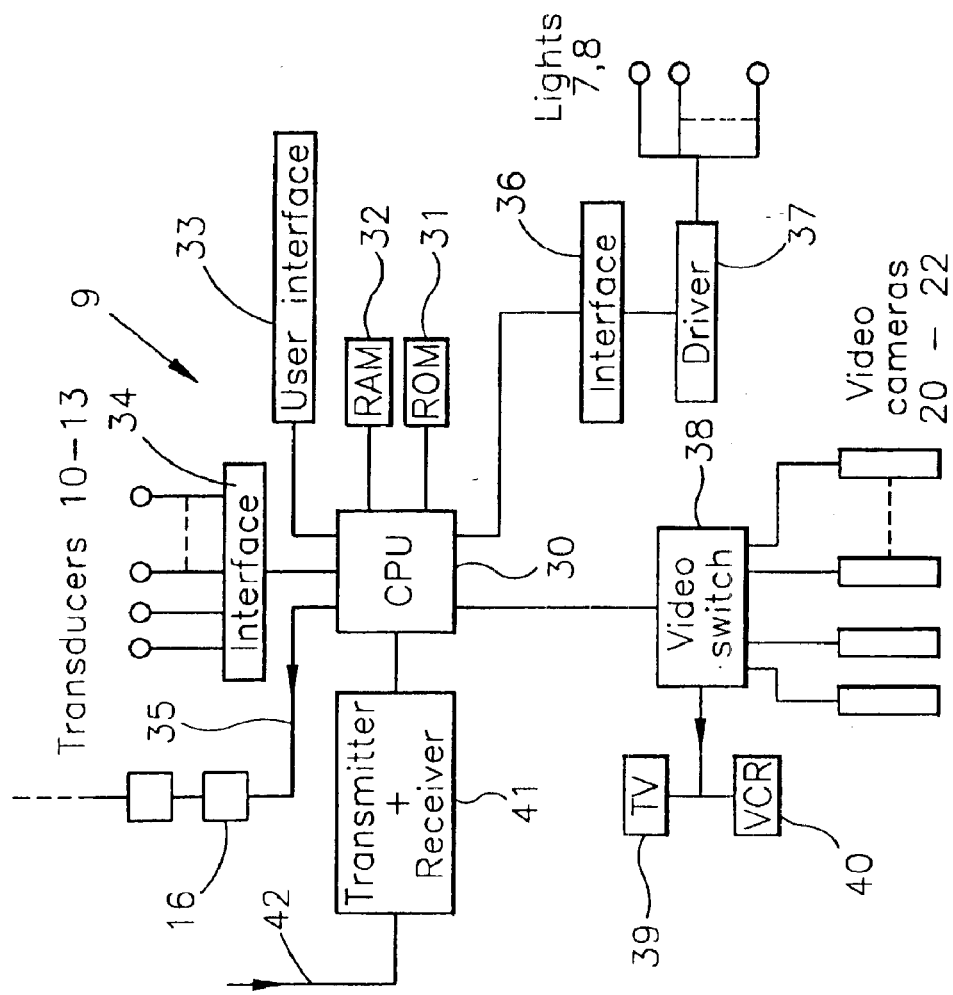
FIG. 2 is a block schematic diagram of part of a system constituting an embodiment of the invention.
Figure 3:
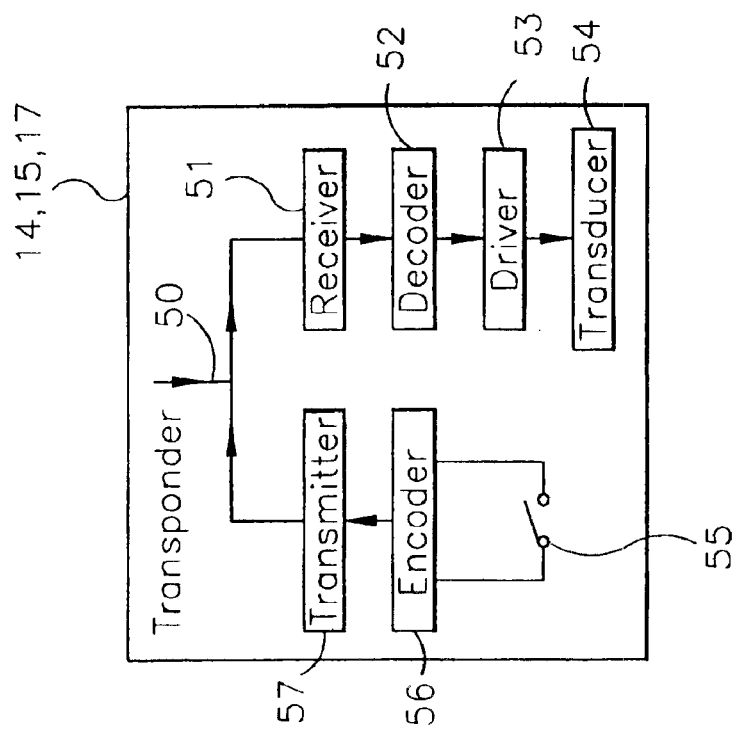
FIG. 3 is a block schematic diagram of one of the transponders forming part of the system constituting an embodiment of the invention.

FIGS. 2 and 3 illustrate components which form an apparatus constituting an embodiment of the invention. In particular, FIG. 2 illustrates the "fixed" elements of the apparatus including the computer 9 which is constituted by a central processing unit (CPU) 30, a read only memory (ROM) 31 which stores a program for controlling the CPU 30, and a random access memory (RAM) 32. The computer 9 also has a user interface 33, for example in the form of a keyboard illustrated in FIG. 1.

The transducers 10 to 13 are connected via a suitable interface 34 to the CPU 30. The CPU 30 is connected to a local area network illustrated at 35 and including various terminals or computers such as the computer 16.

The CPU 30 controls the lights 7 and 8 via an interface 36 and a suitable driver 37. The CPU 30 controls a video switch 38 for selecting one of the video cameras 20 to 22. The output of the video switch 38 is shown as being supplied to a television monitor (TV) 39 and a video cassette recorder (VCR) 40.

The CPU 30 is connected to a transmitter and receiver 41 provided with a suitable aerial 42. The CPU 30 supplies a sequence of codes identifying the transponders, such as 14, 15 and 17, to the transmitter. The transmitter modulates a radio frequency carrier with the sequence of codes and transmits this via the aerial 42. When one of the transponders transmits a radio frequency carrier encoded with the same code or a different code identifying the transponder, this is received via the aerial 42 by the receiver and the demodulated code is supplied to the CPU 30. The CPU 30 can thus identify each of the transponders in accordance with the code.

A typical transponder is illustrated in FIG. 3. The transponder comprises a radio aerial 50 which is connected to a receiver 51 for receiving the radio signals from the transmitter and receiver 41. The output of the receiver 51 is supplied to a decoder 52, whose output is connected via a driver 53 to a transducer 54. A manually actuable switch 55 is connected to an encoder 56 whose output is connected to a transmitter 57. The transmitter 57 shares the aerial 50 with the receiver 51 so as to transmit signals to the transmitter and receiver 41.

When each transponder receives a signal, the receiver 51 supplies the code to the decoder 52 which compares it with a code which identifies the individual transponder. If the received code relates to a different transponder, then the transponder does not respond. However, when the code relating to that transponder is received, this is decoded by the decoder 52 and compared with the locally stored code of the transponder. The positive comparison results in the driver 53 actuating the transducer 54, which emits a single pulse of ultrasonic energy.

When the switch 55 is operated by a user, the encoder 56 supplies a code identifying the individual transponder to the transmitter 57. This may be the same code as that to which the decoder 52 responds or may be a different code. The transponder may therefore be actuated by the user to send a signal to the CPU 30.

In order to determine the positions of all of the transponders forming part of the system, the CPU 30 polls each of the transponders in turn. The currently selected transponder emits the pulse of ultrasonic energy and this is received by the transducers such as 10 to 13 which are spatially distributed about the environment. The ultrasonic energy arriving at the transducers 10 to 13 is converted into corresponding electrical signals which are supplied via the interface 34 to the CPU 30. The CPU 30 measures the time taken by the ultrasonic pulse to travel from the responding transponder to each of the transducers and, from this, determines the position of the transponder within the environment. This determination may be performed in accordance with known techniques which will not therefore be described further.

Figure 4:
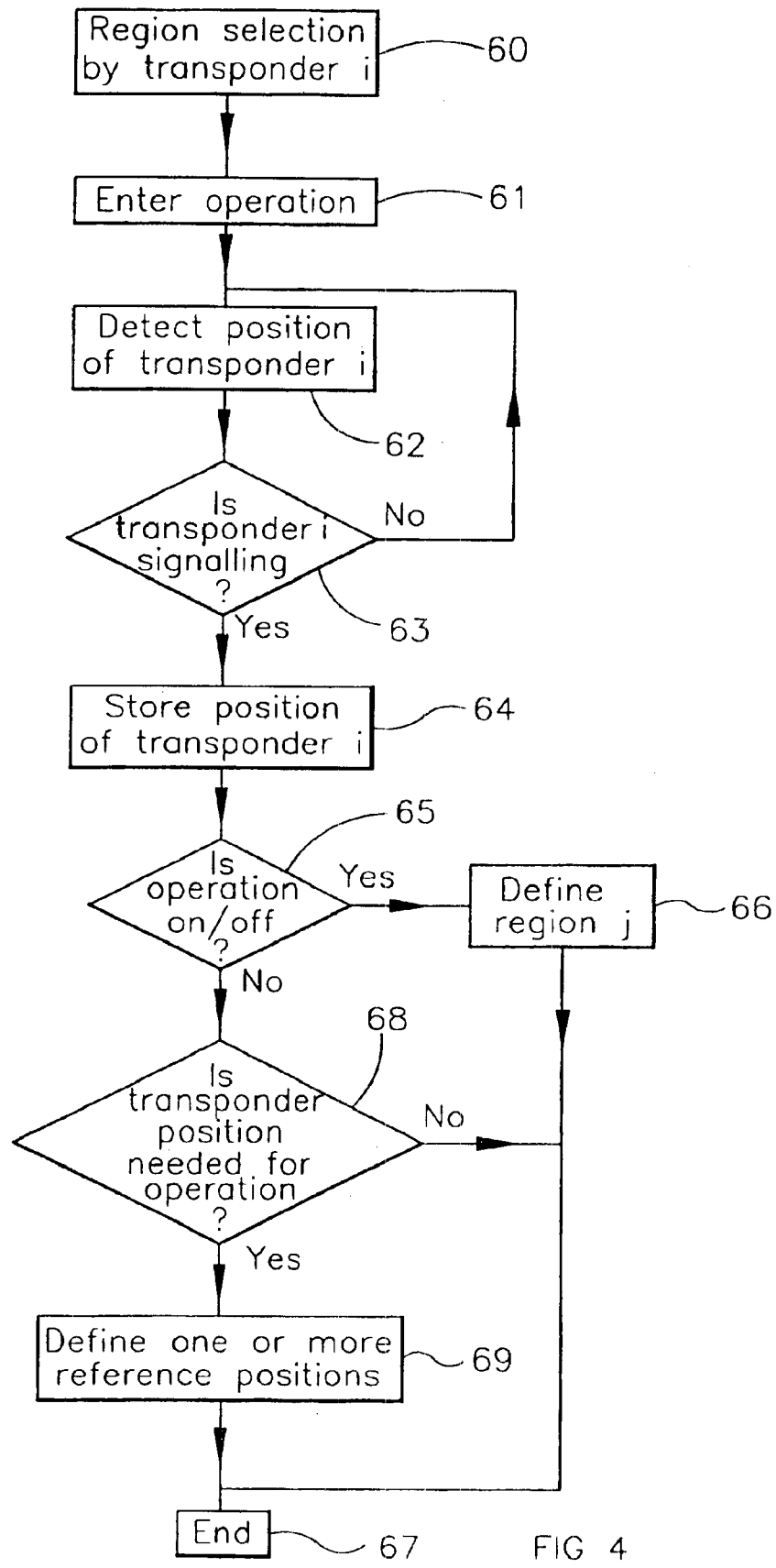
FIG. 4 is a flow diagram illustrating a first part of a method constituting an embodiment of the invention.

FIG. 4 illustrates part of a method constituting an embodiment of the invention, in particular the part concerned with selecting and registering arbitrary regions for performing a controlling function. In particular, steps 60 to 69 are performed each time a region is selected.

In the step 60, a user informs the computer 9 by means of the user interface 33 that a region is to be selected using the transponder identified as "i". In the step 61, the user informs the computer 9 of the operation which is to be controlled when the region has been selected and registered. This may again be achieved using the user interface 33.

In the step 62, the apparatus detects the position of the transponder i. The step 63 determines whether the transponder i is signalling. If not, the steps 62 and 63 are repeated in a loop.

The user 18 positions the transponder 17 at a location which is convenient for controlling the operation specified. For example, as illustrated in FIG. 1, the user 18 positions the transponder 17 adjacent a wall of the room in a region 23 which is to be used to control switching of the room lights 7 and 8 (in addition to conventional control by the wall-mounted switch 19). When the user 18 has placed the transponder 17 at the desired position in the region 23, the user actuates the switch 55 in the transponder 17. The step 63 detects that the transponder i is signalling and the step 64 stores the position of the transponder i so as to register the arbitrarily selected region. As previously described, this region has, at the time of selection and prior thereto, no association whatever with the resulting operation of controlling the room lighting.

The step 65 next determines whether the operation to be controlled is of the on/off type. Such operations correspond to control buttons or switches which may be used for toggling between on and off states of an operation or function. In the case of controlling the room lighting, the operation is of this type and the step 66 defines the region 23 (labelled as "j") as that volume adjacent the wall of the room 1 from which a transponder may control the room lighting. For example, the volume may be defined as a hemispherical volume whose centre is at the recorded position of the transducer i with the radius of the hemisphere being such as to permit convenient control of the room lighting by any transponder.

If the step 65 determines that the operation is not of the on/off type, a step 68 determines whether the operation is such that it requires the position of the transponder in order to control the value of a parameter of the operation. Examples of this are illustrated at 24 and 25 in FIG. 1. The region 24 is adjacent a wall of the room 1 and is intended to be used as a "slider" control such that the relative linear position of a transponder within the region 24 controls a magnitude of an operation. For example, this may be used to control the level of room lighting by controlling the power supplied to the lights 7 and 8. Alternatively, the region 25 may be arbitrarily selected on the top of the desk 2 to provide a two dimensional control, for example similar to a mouse or drafting tablet.

If the operation is such as to require the transponder position, the step 69 is performed. In this step, the user interacts with the computer 9 so as to define the appropriate number of reference positions for controlling the parameter or parameters of the operation. In the case of the region 24, for example, the user may use the transponder i to register the start and stop positions of the required slider control. In the case of the region 25, the user may register reference positions corresponding to the corners of the two dimensional surface used to control, for example, the position of a cursor on a screen.

Figure 5B:
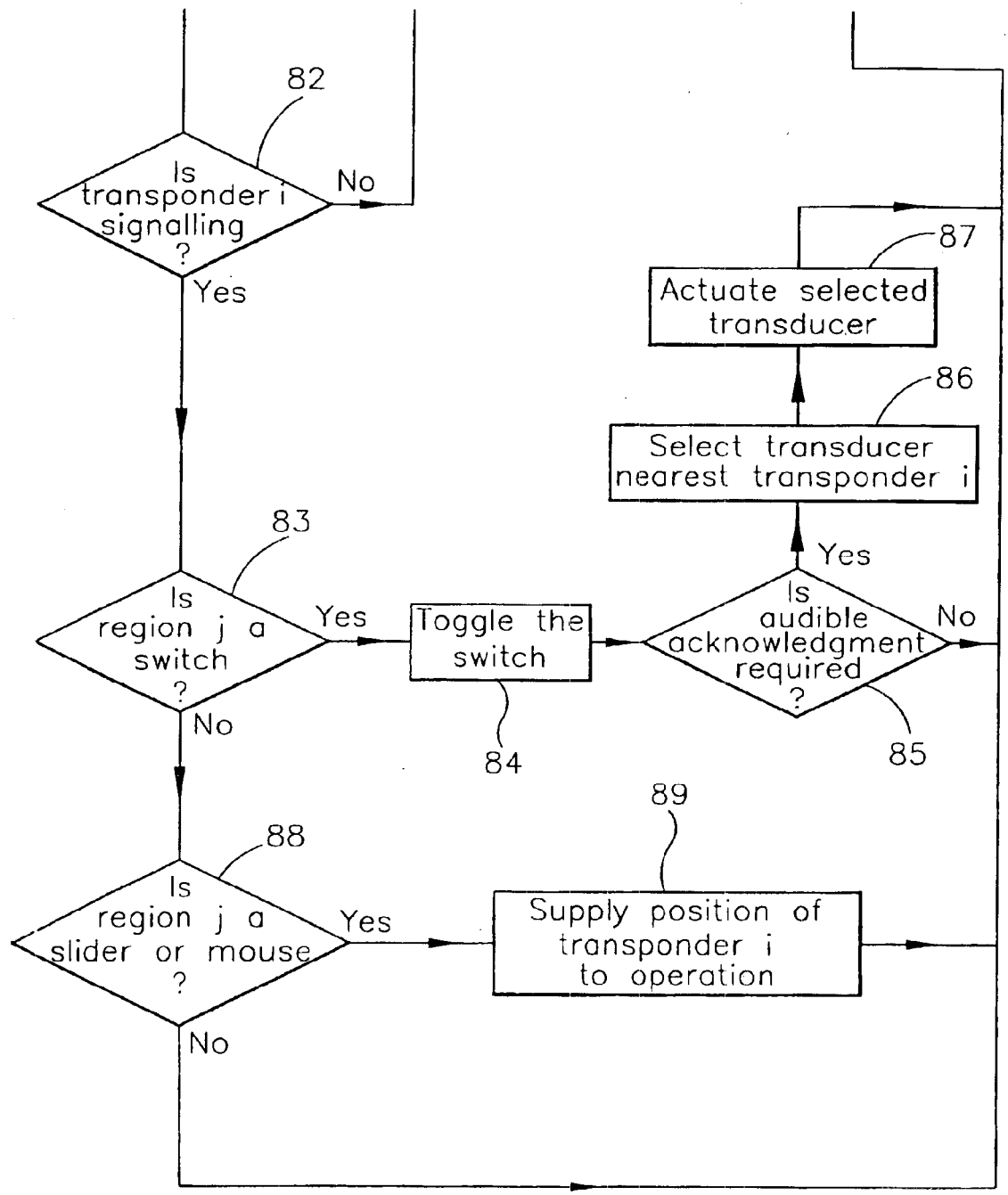
FIG. 5 is a flow diagram illustrating a second part of a method constituting an embodiment of the invention.

Once the selected region and any required reference positions have been registered, the routine ends at the step 67 and the apparatus awaits further instructions, for example to select and register other regions or to enter the part of the method illustrated in FIG. 5.

When all of the control regions have been selected, the apparatus performs a method illustrated by steps 70 to 89 in FIG. 5. However, at any time, the routine illustrated in FIG. 4 may be used to add further selected regions and/or further operations. Similarly, at any time, operations and/or selected regions may be deleted.

The step 70 detects and stores the current position of the transponder i. The step 71 determines whether the apparatus should respond to the transponder i. For example, in the case of the transponders 14 and 15 which are associated with hardware, it may merely be necessary to keep an up-to-date record of the location of the transponders so that no response from such transponders is expected. In that case, the next transponder of the sequence is selected by incrementing the parameter i by one in the step 73. The step 74 tests whether i has exceeded its maximum value I such that all of the transponders have been polled. If so, i is set to one in the step 75 and the step 70 is repeated. Otherwise, the step 70 is repeated with the incremented value of i.

If the transponder i is of the type which may be used for controlling an operation, the current position of the transponder i is used to select a subset of all of the selected regions containing each region whose position is such that it may contain the transponder i. The subset may be much smaller than the set of all of the regions selected and registered with the system. For example, if the regions are identified in accordance with a room which contains them, then the selected subset of regions may contain only those regions in the same room as the transponder i. Alternatively, the subset may be generated by a more complex technique, for example based on spatial indexing as disclosed in British Patent Application No. 9812635.2. In a system having many selected regions, this allows only a relatively small number of such regions to be examined more closely so that system performance is improved. Each of the regions of the subset is allocated a number from 1 to J in the step 72a.

A parameter j is set to one in the step 72b and the step 76 determines whether the transponder i is in the region j. If not, the step 77 increments the parameter j by one and the step 78 determines whether j exceeds its maximum value J indicating that all of the regions have been tested for the presence of the transponder i. If all of the regions have been tested, control returns to the step 73. Otherwise, the step 76 is repeated for the next region.

If the step 76 detects the presence of the transponder i in one of the regions, the step 79 determines whether the apparatus should respond to the presence of the transponder i in the region j. If not, control returns to the step 77. Otherwise, the step 80 determines whether a "follow-me" function has been switched on.

The follow-me function is associated with the video surveillance system and controls which of the video cameras 20 to 22 should be selected. In particular, the step 81 ensures that the video camera whose field of view covers the current location of the transponder i is selected. The CPU 30 thus controls the video switch 38 to select the appropriate video camera and the resulting video signal containing an image of the user who is carrying the transponder 17 is supplied for any suitable purpose. FIG. 2 illustrates the possibilities of displaying the image sequence on the monitor 39 and recording the image sequence in the VCR 40.

The step 82 then determines whether the transponder i is signalling. In particular, this step determines whether the user 18 has actuated the switch 55 of the transponder 17. If not, control returns to the step 77. Otherwise, the step 83 determines whether the region j is registered to perform a switching function such as toggling between on and off states. If so, the step 84 toggles the switch to control the operation which is associated with, for example, the region 23. Thus, if the lights 7 and 8 are off, the CPU 30 switches them on via the interface 36 and the driver 37. Similarly, the lights may be switched off by the user placing the transponder i in the region 23 and actuating the switch 55.

The step 85 then determines whether an audible acknowledgement is required. Although the switching of some operations can be perceived by the user, as in the case of switching on or off the room lighting, some operations may respond in such a way that the user cannot tell whether actuation or control has been successfully achieved. In the case of such operations, an indication is provided to confirm actuation to the user, for example in the form of an audible indication.

If no audible acknowledgement is required, control returns to the step 73. However, if an audible acknowledgement is required, the step 86 selects the appropriate electroacoustic transducer which is nearest the transponder i and which can be heard by the user. In particular, the nearest transducer within the room 1 is selected; there would be no point in selecting a transducer in an adjacent room, even if it were nearer the transponder 17, because the user would not be able to hear it. In the example illustrated in FIGS. 1 and 2, the transducers for providing audible acknowledgement comprise loudspeakers located in the computers 9 and 16. The step 86 determines that the computer 16, whose position has been determined by detecting the position of the transponder 15, is nearest the user 18. The step 87 thus actuates the transducer. In particular, the CPU 30 sends an appropriate message via the local area network 35 to the computer 16, which issues an appropriate sound to provide acknowledgement that the operation has been actuated. Control then returns to the step 73.

The step 88 determines whether the position of the transducer is required in order to control the operation, for example in the case of detecting the transponder 17 in the region 24 or in the region 25. If not, control returns to the step 73. However, if the region j is allocated, for example, as a slider or mouse region, the step 89 supplies the actual position of the transponder i in relation to the reference position or positions which were determined in the step 69 illustrated in FIG. 4. The step 89 converts this position into the value of one or more parameters and supplies these for controlling the operation. For example, if the region 24 is being used to control the level of room illumination, the one dimensional position of the transponder i between the end points of the notional slider is supplied by the CPU 30 via the interface to the driver 37 so as to control the amount of power supplied to the lights 7 and 8. The step 89 may also alter the loop around the step 70 such that the transponder i is polled more frequently than other transponders in order to respond sufficiently quickly to rapid movements of the transponder. Similarly, the step 76 may increase the polling rate of each transponder which is found to be within one of the selected regions.

It is thus possible to select entirely arbitrarily any region within an environment which may be used to perform a control function. A transponder location system keeps a record of the current positions of all of the transponders and controls one or more operations on the basis of the location of the transponders and, where required, whether the transponders are signalling. Thus, any operation may be controlled from anywhere within the environment which is convenient. Control regions may be changed, added or deleted at will without, for example, having to disturb or change wiring to conventional fixed controls such as the light switch 19 shown in FIG. 1. The environment may therefore be tailored without restriction and without requiring any physical changes.

What is claimed is:

1. A method of actuating an operation of a system, comprising the steps of:
   (a) selecting, within an environment for personnel within which said personnel are able to move substantially freely, at least one arbitrary region having no association with said operation at a time of selection;
   (b) storing in a memory said at least one selected region;
   (c) determining a position of at least one transponder anywhere within said environment; and
   (d) actuating said operation when said position of said at least one transponder is determined to be within said at least one selected region,
   in which said step (c) comprises determining a relative position of said at least one transponder with respect to a reference position in said at least one selected region and said step (d) comprises controlling a value of a parameter of said operation in accordance with said relative position.

2. A method as claimed in claim 1, in which said relative position is a one-dimensional position and said parameter is a scalar parameter.

3. A method as claimed in claim 1, in which said relative position is a two-dimensional position adjacent a surface and said parameter is a two dimensional vector parameter.

4. A method as claimed in claim 3, in which said surface is a solid surface within said environment.

5. A method of actuating an operation of a system, comprising the steps of:
   (a) selecting, within an environment for personnel within which said personnel are able to move substantially freely, at least one arbitrary region having no association with said operation at a time of selection;
   (b) storing in a memory said at least one selected region;
   (c) determining a position of at least one transponder anywhere within said environment; and
   (d) actuatuing said operation when said position of said at least one transponder is determined to be within said at least one selected region,
   in which step (a) comprises: disposing said at least one transponder at a location within said at least one selected region; detecting a position of said at least one transponder; providing a user actuated signal to cause said detected position to be stored in said memory; and defining a boundary of said at least one selected region.

6. A method of actuating an operation of a system, comprising the steps of:
   (a) selecting, within an environment for personnel within which said personnel are able to move substantially freely, at least one arbitrary region having no association with said operation at a time of selection;
   (b) storing in a memory said at least one selected region;
   (c) determining a position of at least one transponder anywhere within said environment;
   (d) actuating said operation when said position of said at least one transponder is determined to be within said at least one selected region, and
   further comprising actuating at least one further operation of said system by: selecting within said environment, for said at least one further operation, at least one further arbitrary region having no association with said at least one further operation at a time of selection; storing in said memory said at least one further selected region; and actuating said at least one further operation when said position of said at least one transponder is determined to be within said at least one selected further region.

7. An apparatus for actuating an operation, comprising: at least one transponder; a transponder location system for determining a location of said at least one transponder anywhere within an environment for personnel within which said personnel are able to move substantially freely, said system including a memory for storing data identifying at least one arbitrary selected region having no association with said operation at a time of selection; and a comparator for comprising said location of said at least one transponder with said at least one selected region and for actuating said operation when said location of said at least one transponder is within said at least one selected region, in which said location system determines a relative position of said at least one transponder with respect to a reference position in said at least one selected region and said comparator controls a value of a parameter of said operation in accordance with said relative position.

8. An apparatus as claimed in claim 7, in which said relative position is a one-dimensional position and said parameter is a scalar parameter.

9. An apparatus as claimed in claim 7, in which said relative position is a two-dimensional position adjacent a surface and said parameter is a two-dimensional vector parameter.

10. An apparatus for actuating an operation, comprising: at least one transponder; a transponder location system for determining a location of said at least one transponder anywhere within an environment for personnel within which said personnel are able to move substantially freely, said system including a memory for storing data identifying at least one arbitrary selected region having no association with said operation at a time of selection; and a comparator for comparing said location of said at least one transponder with said at least one selected region and for actuating said operation when said location of said at least one transponder is within said at least one selected region, in which said location system comprises a user interface for actuating a storage of a determined location of said at least one transponder for defining said at least one selected region.

11. An apparatus as for actuating an operation, comprising: at least one transponder; a transponder location system for determining a location of said at least one transponder anywhere within an environment for personnel within which said personnel are able to move substantially freely, said system including a memory for storing data identifying at least one arbitrary selected region having no association with said operation at a time of selection; and a comparator for comparing said location of said at least one transponder with said at least one selected region and for actuating said operation when said location of said at least one transponder is within said at least one selected region, in which said memory stores data identifying at least one further arbitrarily selected region having no association with a further operation at a time of selection and said comparator actuates said further operation when said location of said at least one transponder is within said at least one further selected region.

* * * * *